United States Patent
Shimada

(10) Patent No.: US 8,189,989 B2
(45) Date of Patent: May 29, 2012

(54) PLAYBACK DEVICE FOR OPTICAL RECORDING MEDIUM, OPTICAL RECORDING MEDIUM PLAYBACK METHOD, AND PLAYBACK PROGRAM FOR OPTICAL RECORDING MEDIUM

(75) Inventor: Masaaki Shimada, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 728 days.

(21) Appl. No.: 12/226,685

(22) PCT Filed: Mar. 1, 2007

(86) PCT No.: PCT/JP2007/053895
§ 371 (c)(1),
(2), (4) Date: Jan. 30, 2009

(87) PCT Pub. No.: WO2007/125681

PCT Pub. Date: Nov. 8, 2007

(65) Prior Publication Data
US 2009/0169180 A1    Jul. 2, 2009

(30) Foreign Application Priority Data

Apr. 27, 2006    (JP) .................................. 2006-123363

(51) Int. Cl.
*H04N 7/26* (2006.01)
(52) U.S. Cl. ..................................................... 386/219
(58) Field of Classification Search .................. None
See application file for complete search history.

(56) References Cited

U.S. PATENT DOCUMENTS

| | | | | |
|---|---|---|---|---|
| 5,892,825 | A * | 4/1999 | Mages et al. ..................... 705/51 |
| 6,161,132 | A * | 12/2000 | Roberts et al. ................ 709/219 |
| 6,931,198 | B1 | 8/2005 | Hamada et al. |
| 7,653,869 | B2 * | 1/2010 | Kawasaki et al. .............. 714/821 |
| 7,697,824 | B2 * | 4/2010 | Shimoda et al. ............... 386/243 |
| 2003/0055946 | A1 * | 3/2003 | Amemiya ...................... 709/224 |
| 2003/0110215 | A1 * | 6/2003 | Joao ............................... 709/203 |
| 2004/0019685 | A1 | 1/2004 | Morita et al. |
| 2004/0218900 | A1 | 11/2004 | Yoon et al. |
| 2005/0259968 | A1 | 11/2005 | Tsumagari et al. |
| 2006/0149850 | A1 * | 7/2006 | Bowman ....................... 709/231 |
| 2006/0212697 | A1 * | 9/2006 | Sato et al. ...................... 713/150 |
| 2006/0227973 | A1 | 10/2006 | Takashima et al. |
| 2007/0047921 | A1 * | 3/2007 | Kelly et al. ................... 386/125 |
| 2007/0060135 | A1 * | 3/2007 | Lin ................................ 455/445 |
| 2007/0274180 | A1 | 11/2007 | Kato et al. |
| 2008/0177893 | A1 * | 7/2008 | Bowra et al. .................. 709/231 |

FOREIGN PATENT DOCUMENTS

| | | |
|---|---|---|
| EP | 1 457 984 A2 | 9/2004 |
| JP | 2000-032429 A | 1/2000 |
| JP | 2000-207873 A | 7/2000 |
| JP | 2004-296065 A | 10/2004 |
| JP | 2005-072911 A | 3/2005 |
| JP | 2005-92830 A | 4/2005 |
| JP | 2005-093001 A | 4/2005 |
| JP | 2005-123933 A | 5/2005 |
| JP | 2005-159589 A | 6/2005 |
| JP | 2005-328207 A | 11/2005 |

\* cited by examiner

*Primary Examiner* — Thai Tran
*Assistant Examiner* — Sunghyoun Park
(74) *Attorney, Agent, or Firm* — Birch, Stewart, Kolasch & Birch, LLP.

(57) ABSTRACT

To play back an optical disk requiring network connection, a playback device is provided, which has a function by which the network condition is evaluated before playing back a title. The playback device plays back the optical disk including programs connecting through the network to data-supplying sources; the playback device determines whether or not the network circuit is available; and when the network connection is not available depending on a network connection status or its memory amount, the playback device plays back with a non-network-ready mode.

19 Claims, 9 Drawing Sheets

FIG.5

```
221 ~ playback-control-information file () { general information of disk() {
            Studio_ID  ~ 501
            Disc_ID  ~ 502
        } num_of_title  ~ 503
        for( i=0; i< num_of_title; i++ ){
            type_of_title  ~ 504
            if(type_of_title == normal title){
                ref_to_playlist_id    ~ 505
            }else(type_of_title == program title) {
                ref_to_program_id   ~ 506
            }
        } playlist information()  ~ 507 num_of_stream  ~ 508
        for( n=0; n< num_of_stream; n++ ){
            stream filename   ~ 509
            attribute information management table()  ~ 510
            access point management table()  ~ 511
        }

```
222 ~~ program management file () { num_of_program  ~~ 601
        for( i=0; i< num_of_program; i++ ){
            program_name  ~~ 602
            general information of program ()

num_of_application  ~~ 603
            for( j=0; j< num_of_application; j++ ){
                    type_of_application  ~~ 604
                    application_ID  ~~ 605 general information of application ()
            }
        }
}
```

FIG.7

| NO | connection success (701) | connection-date-time (702) | communication speed (703) |
|---|---|---|---|
| 1 | OK | 2006/03/11 22:00 | 500kbps |
| 2 | NG | 2006/03/11 13:00 | × |
| 3 | OK | 2006/03/13 17:00 | 1600bps |
| 4 | NG | 2006/03/15 13:10 | × |
| 5 | OK | 2006/03/16 23:00 | 300kbps |

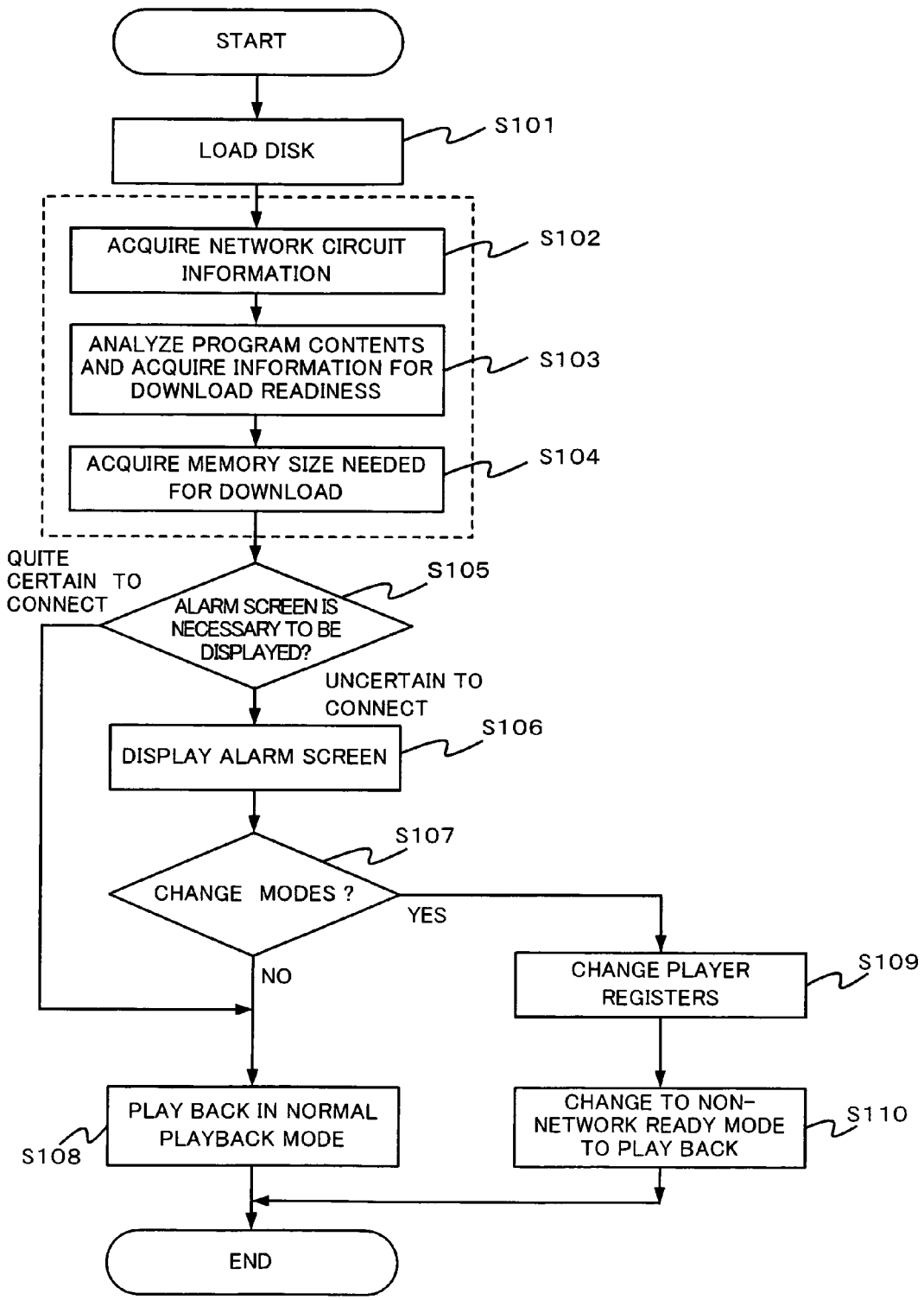

PLAYBACK DEVICE FOR OPTICAL RECORDING MEDIUM, OPTICAL RECORDING MEDIUM PLAYBACK METHOD, AND PLAYBACK PROGRAM FOR OPTICAL RECORDING MEDIUM

TECHNICAL FIELD

The present invention relates to playback devices that play back information recorded on an optical recording medium; it especially relates to a playback device for an optical recording medium on which a program realizing an interactive function is recorded to be executed in order that online network contents (data) can be downloaded.

BACKGROUND ART

DVD standards have been known for devices that play back stream information recorded on optical disks. On the other hand, the devices that meet with the standards for next-generation optical disks such as BD (Blu-ray Disc standards) and HD-DVD standards cannot only play back stream information thereon, but also execute programs recorded on the optical disks. The programs are recorded to provide an interactive function, and the programs are executed so that new contents (data) can be downloaded through the network and played back in synchronization with the stream information.

As an example of application programs using the network, a video-playback device has been known in which a file that updates the contents recorded on the optical disk can be downloaded (for example, refer to Patent document 1). According to Patent document 1, the network can be used, as a sub-channel, to download a language into which the contents are not dubbed. Therefore, even if there is a playback-only disk on which movie contents are recorded with Japanese voice only, English-dubbed voices are downloaded, upon playing the disk, to a local storage in the video-playback device so that videos in the optical disk can be played back in synchronization with the English-dubbed voices having been downloaded.

There is also known a video-playback device (for example, refer to Patent document 2), in which when there exist Web contents that correspond to video scenes currently being played back an icon is displayed to show that there exist online network contents, so that users are notified that the video scenes link to the Web contents. This video-playback device holds history information about connecting to Web contents in the video-playback device; and when connecting to Web contents, the device displays or hides the icon described above by referring to the connection history. When there exists less possibility for connecting the network, the network connect icon is hidden, preventing its users from unnecessarily doing access operations.

Patent Document 1: Japanese Patent Laid Open NO. 2005-159589 (page 4-5, FIG. 3)
Patent Document 2: Japanese Patent Laid Open NO. 2000-207873 (page 2-5, FIG. 4)

DISCLOSURE OF INVENTION

In Patent document 1, there is description about a video-playback device that can download an update file necessary to the contents recorded in the optical disk. However, it is not disclosed about how to deal with such cases when the network cannot be used (for example, "disconnection of the network cable", "no destination content in the network", and "an extremely slow communication speed due to heavy traffic on the network circuits").

As described above, Patent document 2 discloses a technique in which a playback device holds history information about connecting to Web contents and determines, on the basis of the information, whether or not a probability of successful connection to a destination content recorded in the connection history information is high. In the technique of Patent Document 2, only the destinations recorded in the connection history information are taken into consideration for connection; however, new destinations with which the playback device has not communicated through the network are not taken into consideration. In addition, in the technique, such cases when a network circuit itself does not effectively function—for example, when the network cable is disconnected or when no setting operations are performed for the network connection—are not taken into consideration.

The present invention is made to solve the problems described above, and aims to provide a playback device for an optical recording medium that has a function to determine a network condition, when playing back an optical recording medium with a network connection function, before playback of the title.

According to the present invention, a playback device for an optical recording medium including a program that connects to a data-supplying source through the network comprises:

a network-circuit-information acquiring unit that outputs a connection condition signal concerning connection condition between the network and the playback device for an optical recording medium;

a system control unit that outputs, on the basis of the connection condition signal outputted from the network-circuit-information acquiring unit, a determination signal indicating whether or not to connect to the network; and a data playback unit that plays back data recorded in the optical recording medium in a network-ready mode in which playback is performed with reference to the data supplied from the data-supplying source, or in a non-network-ready mode in which playback is performed without reference to the data supplied from the data-supplying source;

wherein, when the determination signal outputted from the system control unit indicates that the playback device of the optical recording medium does not connect to the data-supplying source, the data playback unit plays back data recorded in the optical recording medium in the non-network-ready mode.

By configuring a playback device for an optical recording medium as described above, the device according to the present invention determines whether to be able to use the network circuit before playing back the optical recording medium including network connect functions; when the network cannot be used, the playback device performs playback in the non-network-ready mode. Thus, it is possible to reduce possibility of operations that are fundamentally unnecessary for the users.

BRIEF DESCRIPTION OF DRAWINGS

FIG. 5 shows data syntax in a playback-control-information file used in Embodiment 1 according to the present invention;

FIG. 6 shows data syntax in a program management file used in Embodiment 1 according to the present invention;

FIG. 7 shows a list of network circuit availability that are obtained by a network-circuit-information acquiring unit of Embodiment 1 according to the present invention;

FIG. 9 is a flow chart of operations for Embodiment 1 according to the present invention.

Figure 1:
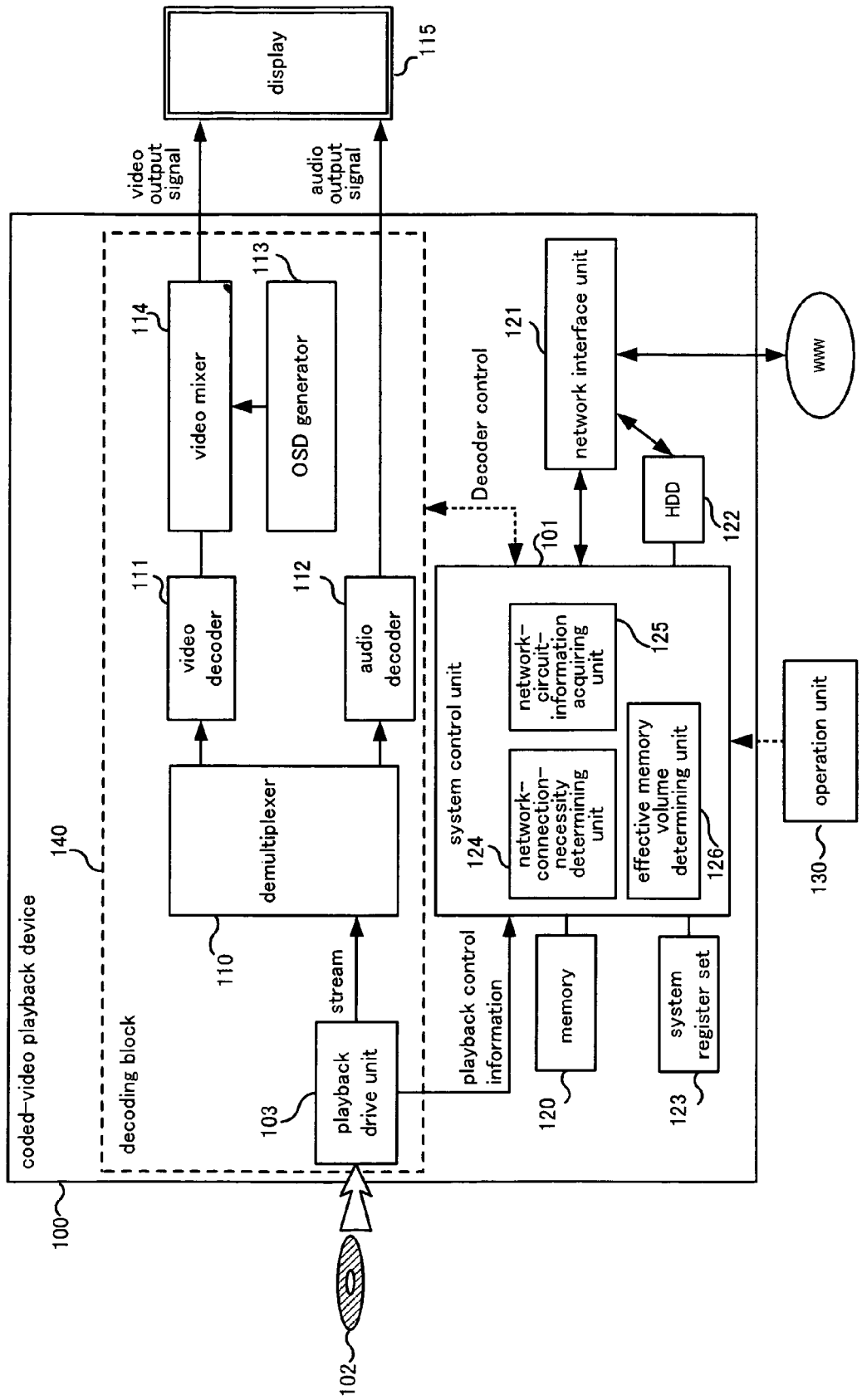
FIG. 1 is a block diagram of a system configuration described in Embodiment 1 according to the present invention.

REFERENCE NUMERALS 100 playback device
101 system control unit
102 optical disk
103 playback drive unit
110 demultiplexer
111 video decoder
112 audio decoder
113 OSD generator
114 video mixer
115 display
120 memory
121 network interface unit
122 HDD
123 system register set
124 network-connection-necessity determining unit
125 network-circuit-information acquiring unit
126 effective memory volume determining unit
130 operation unit
140 decoding block
201 inner circumference side of the disk
202 outer circumference side of the disk
210 read-in area
211 file management information area
212 user data area
213 read-out area
220 playback-control-information area
221 playback-control-information file
222 program management file
230 stream information area
231 stream information file
240 program record area
241 program file
300 root directory
301 disk directory
302 stream management directory
303 program management directory
400 packet
401 header information
402 ID
501 Studio_ID
502 Disc_ID
503 num_of_title
504 type_of_title
505 ref_to_playlist_id
506 ref_to_program_id
507 playlist information
508 num_of_stream
509 stream filename
510 attribute information management table
511 access point management table
601 num_of_program
602 program_name
603 num_of_application
604 type_of_application
605 application_ID
701 connection availability status
702 connection-date-time information
703 communication speed information
801 'continue current playback mode' button
802 'change to non-network-ready mode' button
803 area for displaying the status of the network circuit
804 area for displaying download environment

BEST MODE FOR CARRYING OUT THE INVENTION

Embodiment 1

In Embodiment 1, a playback device 100 will be explained, in which, when the playback device cannot use a network circuit but plays back an optical disk including a program having a function to connect to the network, the device notifies in advance its users that network contents cannot be used, so that the device can prevent them from operating actually unnecessary operations.

Note that hereinafter, "being unable to use network contents" means a condition that "network circuits cannot be used normally", for example, a condition that the network cable is broken, a condition that the network configuration of the playback device itself is not appropriately performed, a condition that the network load is extremely high, and a condition that there exists no destination content.

FIG. 1 is a block diagram representing a system configuration of Embodiment 1 according to the present invention. In the figure, a system control unit 101 integrally controls the entire playback device 100. In an optical recording medium 102 (hereinafter, referred to as "an optical disk"), multiplexed stream information of coded screen images described later and playback control information for the stream information are recorded. Playing back files in the optical disk 102 is performed through a playback drive unit 103.

The playback drive unit 103 sequentially reads stream information files, described later, and then a demultiplexer 110 separates a stream to extract a video stream or an audio stream which is coded and compressed; a video decoder 111 decodes to a video signal the video stream that is separated by the demultiplexer 110 but still coded in such as MPEG-2; an audio decoder 112 decodes to an audio output signal the audio stream that is separated by the demultiplexer 110 but still coded in such as AC-3; an OSD (On Screen Display) generator 113 generates signals for the display images that the system control unit 101 creates as alarm screens, device operation status screens, function selection screens and the like; a video mixer 114 superimposes into the video signal generated by the video decoder 111 the video signals generated by the OSD generator 113 and outputs as a video output signal; and the decoded video output signal and the audio output signal outputted from the audio decoder 112 are converted to be watched and listened to through a display 115.

A memory 120 temporarily stores the playback control information of the stream information recorded in the optical disk 102 so that the system control unit 101 can quickly access the playback control information. In the playback control information, there included is information such as attribute information about video and audio in the coded video stream separated from the stream information recorded in the optical disk 102 and information indicating a correspondence relation between playback start time information and playback start position information on a stream information access basis (typically, by GOP unit). A network interface unit 121 connects the playback device 100 to the network; an HDD (local storage) 122 records information downloaded from the network. The HDD 122 can serve its purpose as long as it is a nonvolatile recording medium, such as a SmartMedia and a memory card. In addition, it is not necessarily placed inside and may be detachable.

A system register set 123 includes a plurality of registers that can store system parameters which define operating conditions of the playback device 100. The system parameters include information representing playback state such as a title number and a playlist number that are being currently played back, video/audio playback compatibility, and readiness for accessing the network (as defined as a profile). Here, the system parameter about its readiness for accessing the network indicates whether or not the playback device 100 itself has a function to access the network, and never indicates whether the network communication is available.

To play back the optical disk 102, two playback paths are provided—a network-ready mode and a non-network-ready mode, and the playback device 100 typically uses an optical disk title method in which the device 100 determines the playback path on the basis of the system parameter representing its ability to access the network.

A network-connection-necessity determining unit 124 determines whether each program recorded in the optical disk 102 needs to connect to the network. The network-connection-necessity determining unit 124 outputs a detection signal indicating whether or not each of the programs recorded in the optical disk 102 needs to connect to the network. A network-circuit-information acquiring unit 125 determines whether the network interface unit 121 can normally communicate with the external network circuit. At power-on of the playback device 100 or at the start of playing back the optical disk 102, the network-circuit-information acquiring unit 125 determines whether the network is in a normal condition to be used. In addition, the acquiring unit may have a function to measure the execution speed of the network at the same time when it determines whether the network can be used. The network-circuit-information acquiring unit 125 outputs a detection signal that represents a connection condition between the playback device 100 and the external network circuit.

An effective memory volume determining unit 126 determines whether the amount of files to be downloaded from the network is the one that an HDD 122—a medium recording download files—can store. The figure exemplifies the network-connection-necessity determining unit 124, the network-circuit-information acquiring unit 125, and the effective memory volume determining unit 126 which are configured with firmware or the like in the system control unit 101; however, they may be outside of the system control unit 101 and may be hardware having corresponding functions. The effective memory volume determining unit 126 outputs a volume detection signal representing a data amount supplied from a data-supplying source described later.

From an operation unit 130, a user or the like sends commands to the playback device 100. Generally, the operation unit 130 is an operation panel that is placed at a front panel of the playback device 100 or a remote control unit. The playback device 100 interprets a command requested from the operation unit 130, and controls a decoding block (data playback unit) 140 to play back arbitrary stream information.

For example, when the user commands the operation unit 130 to play back an arbitrary program title, the command is transmitted to the system control unit 101. Then, the system control unit 101 reads out from playback control information stored in the memory 120 the playlist information, which is described later, constituting that program title. The playlist information is composed of one or more playing back sections called play items, and the control unit obtains a physical address in the optical disk 102 at which a file of stream information specified by each play item is recorded. Then, the stream information read out from its corresponding address is played back at the playback drive unit 103, and sequentially sent through the demultiplexer 110 and the decoders to output video/audio information at the display 115.

When connecting to the network, the program title described above has been linked to a program, which is executed to access a URL site (data-supplying source) in the network that is specified in the program.

Figure 2:
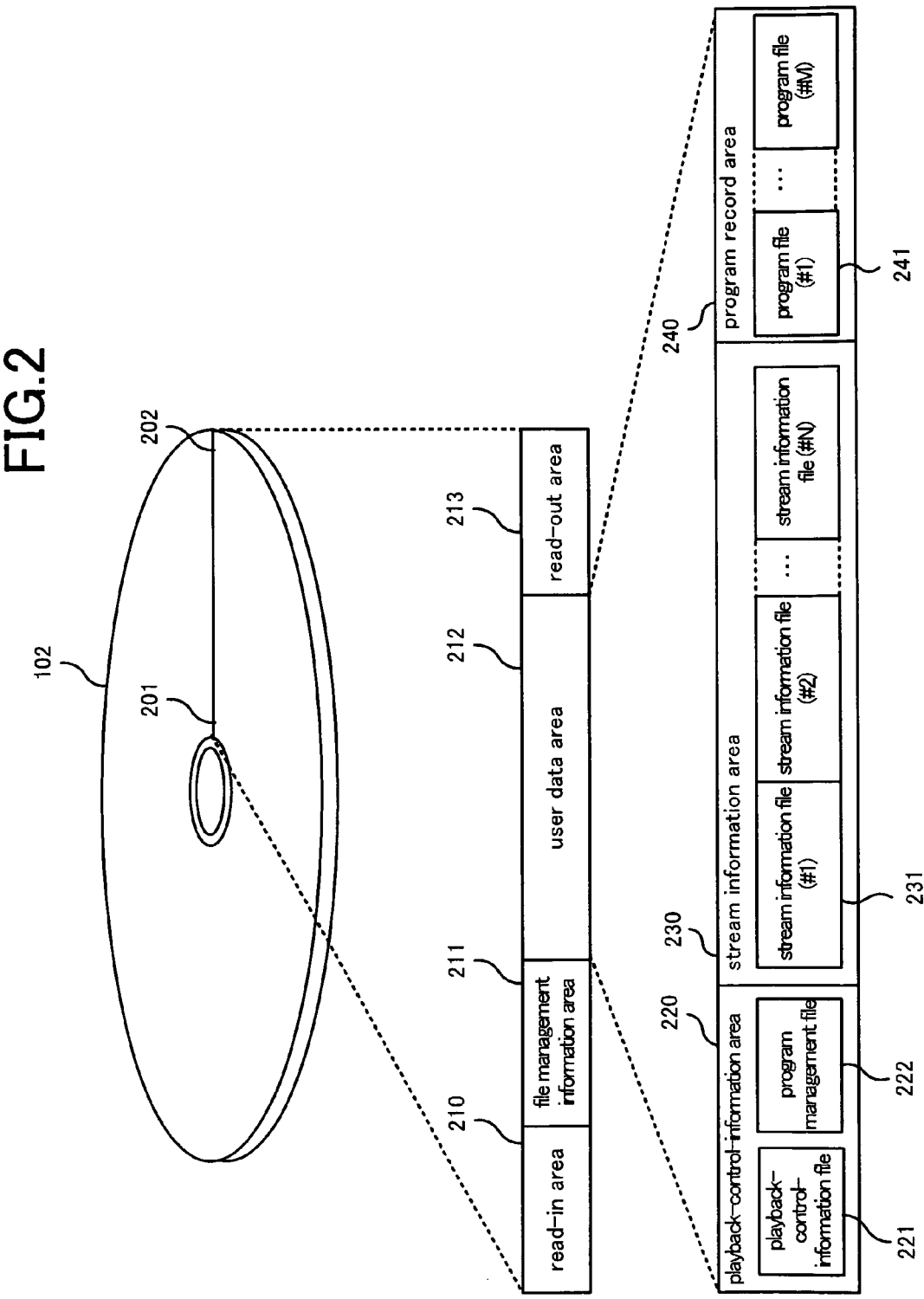
FIG. 2 is an external view of an optical disk used in Embodiment 1 according to the present invention and shows an internal file data structure thereof.

FIG. 2 illustrates the exterior appearance of the optical disk 102 and a data structure of internal files thereof. In the figure, file data on the optical disk 102 is recorded from the inner circumference side 201 of the disk 102 toward the outer circumference side 202 thereof. Start information, physical characteristics and the like of the optical disk 102 are written in a read-in area 210; file system information of the optical disk 102 is stored in a file management information area 211; a content supplier can in advance record information in a user data area 212; and disk terminal information is written in a read-out area 213.

The user data area 212 consists of a playback-control-information area 220, a stream information area 230, and a program record area 240. In the stream information area 230 recorded are one or more stream information files 231 which contain series of streams multiplexed and compressed. A video stream and an audio stream are multiplexed to be contained in the stream information files 231, from which the demultiplexer 110 separates them for generating a video stream and an audio stream. For further explanation, it is assumed that video streams are stream information coded in a compression unit such as a GOP (Group of Picture) defined in the MPEG-2 ES (elementary stream) standards.

In the program record area 240, a plurality of program files 241 is recorded. Each program file 241 is an executable file written in a programming language such as JAVA (trademark) to enhance an interactive function such as accessing an arbitrary Web site. The program files 241 may be executed in synchronization with the stream information file 231 or may be executed independently. In addition, if a disk does not require network connection, it is not necessary to record the program files 241 therein.

In the playback-control-information area 220, a single playback-control-information file 221 and a single program management file 222 are recorded. In the playback-control-information file 221, written are playback section information and playback sequence information of program titles, content information of the stream information file 231 and the like. As for each of access points (generally, GOPs) composing the stream information file 231, also described are a start address, display start time information and the like. In addition, the access point may be composed of a plurality of GOPs. The program management file 222 contains management information for the program files 241, such as attribution information of the programs and information indicating a stream information file 231 to be played back in synchronization with each program.

In Embodiment 1, explanation is made for a case where there are a single playback-control-information file 221 and a single program management file 222; however, each of the information may be subdivided into a plurality of files to be managed. This configuration shows an example in which the playback-control-information file 221 contains all of the program title information and the playlist information recorded in the optical disk 102; however, the information file may be divided to be stored on an information basis.

Figure 3:
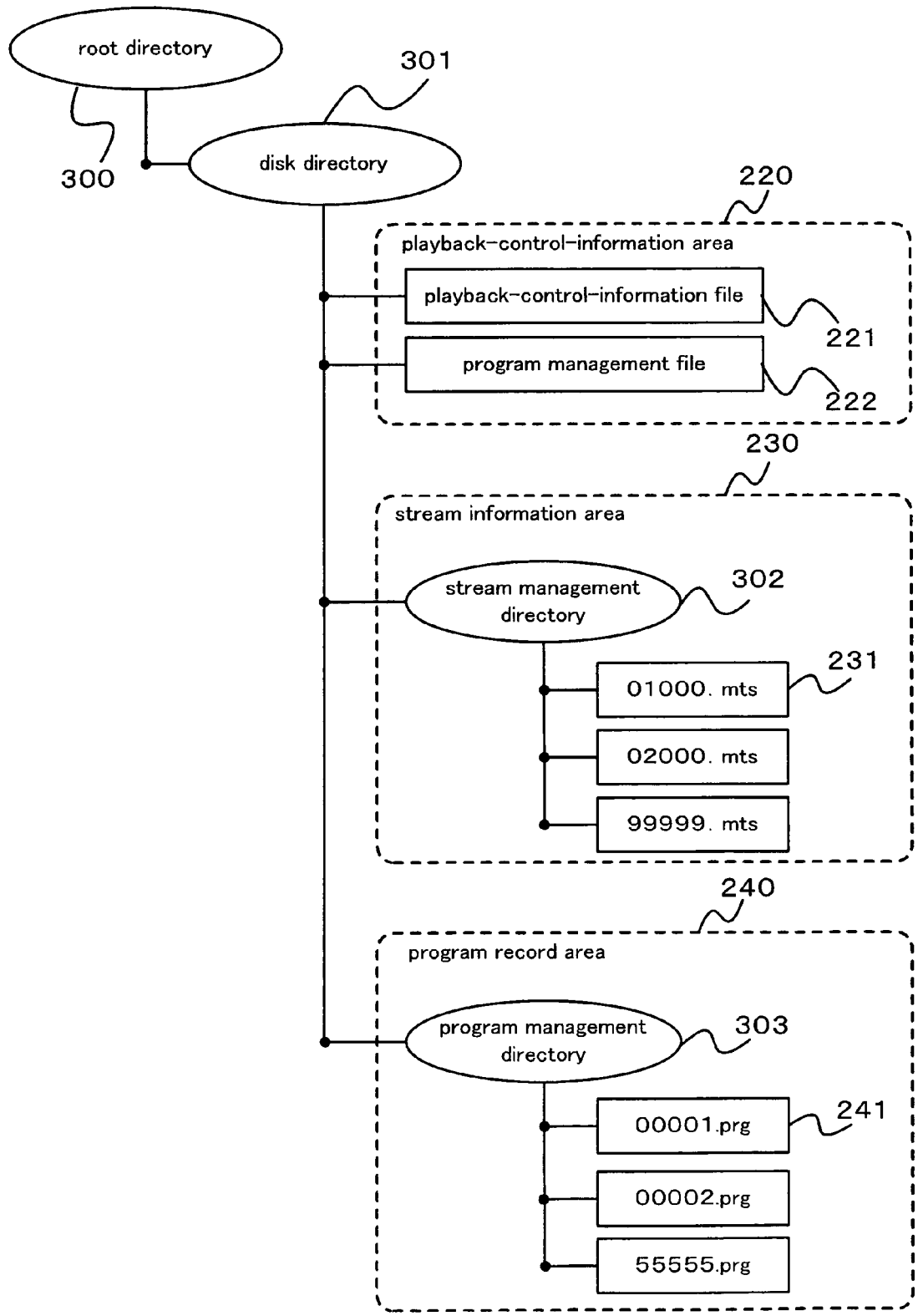
FIG. 3 shows a logical file structure of the optical disk used in Embodiment 1 according to the present invention.

FIG. 3 illustrates a logical file structure of the optical disk 102 of Embodiment 1 according to the present invention. A root directory 300 is the highest directory structure in a file structure in which files are configured logically and hierarchically; a disk directory 301 is a directory structure hierarchically subordinate to the root directory 300. The disk directory 301 is configured with the playback-control-information file 221 that is the disk content management information recorded in the optical disk 102, the program management file 222, a stream management directory 302 that is a folder storing all the stream information files 231 together, and a program management directory 303 that is a folder storing all the program files 241 together.

In the figure, it is assumed for explanation that the stream information files 231 and the program files 241 are recorded with five-digit filenames. For the filenames, any five-digit numbers are applicable and they need not be serial numbers. As an example, the stream information files 231 and the program files 241 are arranged in the separate directories; however, they may be arranged in the same directory or directly arranged in the root directory 300. It has been exemplified that the stream information files 231 and the program files 241 are each created as individual files corresponding to a certain management unit; however, they may be recorded to a single file each.

Figure 4:
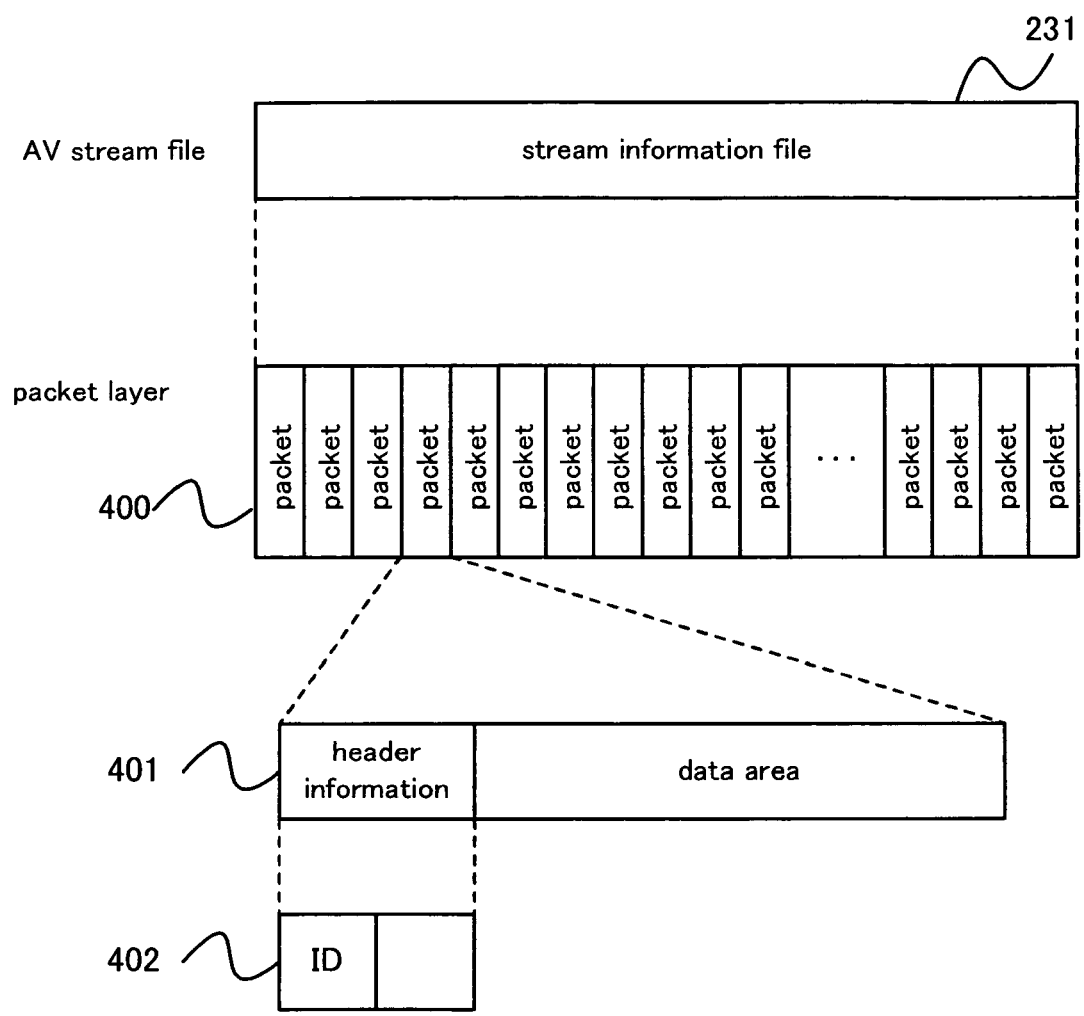
FIG. 4 is a structural view of the stream that shows an internal data structure of a stream information file in the optical disk used in Embodiment 1 according to the present invention.

FIG. 4 is a stream structure view showing an internal data structure of a stream information file 231. The stream information file 231 is composed of fixed-length data units each called a packet 400. Video data, audio data, and stream management data are divided into packets 400, and then multiplexed to create the stream information file 231. At the top of each packet 400, there is header information 401 which contains an ID (Identification) 402 for identifying a type of data in the packet 400. By using the IDs 402, the demultiplexer 110 sorts out packets into video data, audio data, stream management data and the like.

FIG. 5 is a diagram to explain the syntax of the playback-control-information file 221. "General disk information" is provided to identify the disk and contains a Studio_ID 501—a number to identify a producer of the optical disk 102—and a Disc_ID 502—a number to identify the contents in the optical disk 102. That is, by the Studio_ID 501 and the Disc_ID 502, the contents recorded in the optical disk 102 are identified among all disks distributed in the market. The Studio_ID 501 and the Disc_ID 502 are also used to identify an update file to be downloaded.

In the information file, a "num_of_title 503" is recorded to show the total number of program titles recorded in the optical disk 102, and the next loop statement repeats statements (below "for" statement) as many times as those indicated by the "num_of_title 503". A "type_of_title 504" holds information to distinguish the type of the program title. As for the program title, there exist two types of titles: one is a "normal title", which is played back according to playlist information; and the other is a "program title", which is played back by executing a program. The type is identified with its "type_of_title 504". When the "type_of_title 504" indicates the normal title, a "ref_to_playlist_id 505" is recorded as information to specify playlist information described later. When the "type_of_title 504" indicates the program title, a "ref_to_program_id 506" is recorded as information to specify a program described later.

In the file, "playlist information 507" is also recorded. The "playlist information 507" contains information about all the playlists, which is configuration information for a program; that is, it contains playback section information (the filename of a stream information file to be played back, and its playback start time and playback end time) for each playlist. On the basis of its playback section information, the playback device 100 can determine which section in a stream information file 231 is to be played back.

In the information file, a "num_of_stream 508" is recorded to show the total number of stream information files 231 recorded in the optical disk 102, and the next loop statement repeats statements (below "for" statement) as many times as those indicated by the "num_of_stream 508". A stream filename 509 is five-digit figure information representing the name of the stream information file 231. An attribute information management table 510 contains attribution information of video information and audio information used in the stream information file 231. Furthermore, each of video information and audio information that configure a stream contains packet IDs and the like, and the demultiplexer 110 separates video data, audio data, stream management data and the like, using the packet IDs.

An access point management table 511 is a list of information on which a stream read-out position and playback start time are recorded for each access point; by using the information, random-access playback that is needed for such as a search operation and special playback operations can be performed. For example, when video data are encoded into an MPEG-2 video stream, the beginning of a GOP (Group of Picture) corresponds to an access point; for each GOP, information of playback start time and a playback start address (a relative position from the beginning of its stream file) is written in the table. The playback device 100 calculates the playback start address of the stream information file 231 from its playback start time information to perform random-access playback.

FIG. 6 is a diagram for explaining the syntax of the program management file 222. In the management file, a "num_of_program 601" is recorded to show the total number of program files 241 recorded in the optical disk 102, and the next loop statement repeats statements (below "for" statement) as many times as those indicated by the "num_of_program 601". A "program_name 602" is five-digit figure information representing the name of the program file 241, so that the information specifies the program file 241. As for program general information, recorded are its general information such as programming date and operational restrictions.

A program is composed of a plurality of applications, and the total number of the applications is recorded in a "num_of_application 603". The next loop statement repeats statements (below "for" statement) as many times as those indicated by the "num_of_application 603". A "type_of_application 604" is information that indicates whether or not the application is to be connected to the network. In an "application_ID 605", recorded is a unique ID number that identifies an application. In general information of an application, which is shown in the figure, recorded is general information such as information that specifies a stream information file 231 to be played back in synchronization with the application, and restrictions on operations of the application.

According to the present invention, when a program is executed, all applications composing the program are checked on the basis of the "type_of_application 604" whether or not the program contains an application connecting to the network. In addition, when an optical disk 102 contains no attribution information such as the "type_of_application 604" in the program management file 222, information in the referring program file 241 may be directly analyzed to determine whether or not to connect to the network.

FIG. 7 is a list of network circuit availability that the network-circuit-information acquiring unit 125 obtains (hereinafter, referred to as "a circuit-condition history list"). The circuit-condition history list is composed of connection availability status 701, connection-date-time information 702, and communication speed information 703. In the connection availability status 701, recorded is information about whether connection is successfully performed; in the figure, "'OK' means successful connection", and "'NG' means connection failure". In the connection-date-time information 702, recorded is time when the device has tried to establish a network connection. The time information may be obtained from a time information acquisition unit that is not illustrated in the figures, or may be obtained when connected to the network (only when connected successfully). In the communication speed information 703, recorded is a circuit speed when connected to the network. The circuit-condition history list is made by the network-circuit-information acquiring unit 125 upon an instruction from the system control unit 101. The circuit-condition history list is recorded in the memory 120 or the HDD 122 for quick access.

It is only necessary for the circuit-condition history list to contain as minimum information the latest connection availability status 701; the connection-date-time information 702 and the communication speed information 703 are not inevitably needed. However, by listing the connection availability statuses 701, the connection-date-time information 702, and the communication speed information 703, the user can see at a glance time slots during which its circuit speed is fast.

Figure 8:
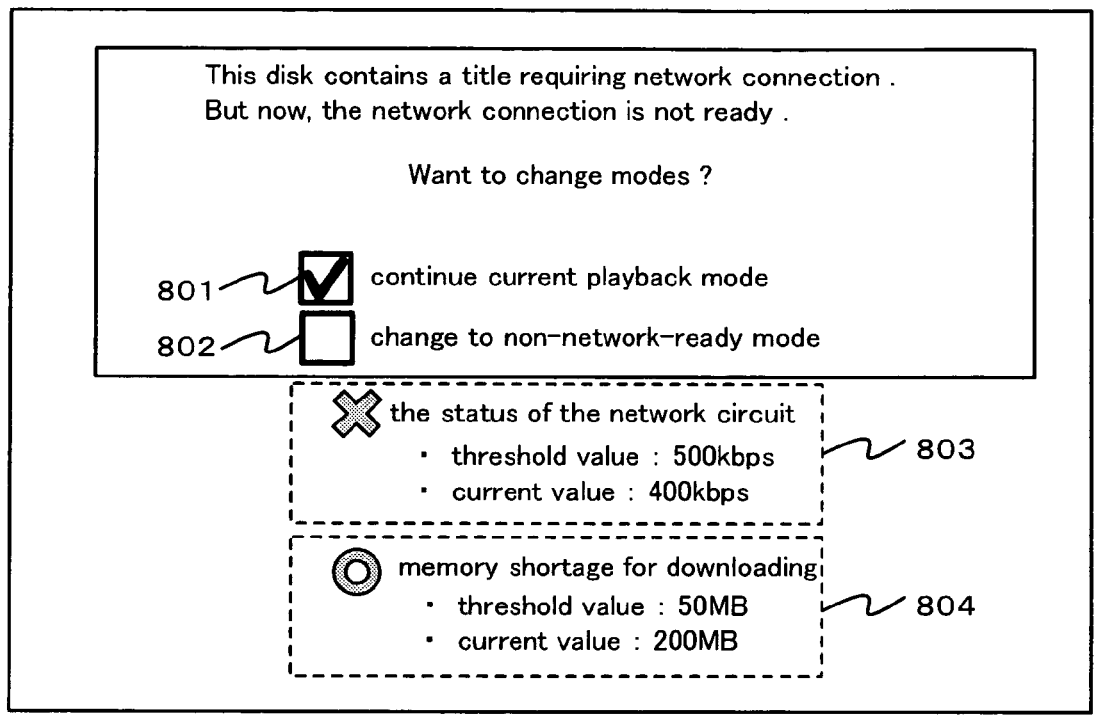
FIG. 8 is an example of an alarm screen that is displayed when playing back an optical disk requiring network connection in a situation where a coded-video playback device of Embodiment 1 according to the present invention cannot use a network circuit.

FIG. 8 shows an example of an alarm screen that is displayed, when network connection is necessary to play back the optical disk 102 but the playback device 100 cannot use the network circuit. On the alarm screen, a 'continue current playback mode' button 801 and a 'change to non-network-ready mode' button 802 are provided; through the operation unit 130, the user selects and pushes one of these buttons to change its playback mode that specify whether or not the playback device 100 connects to the network.

As auxiliary relevant information, whether or not the communication through the network is in good condition may be displayed in an area 803 for displaying the status of the network circuit. Criteria (threshold value) for determining whether the network circuit is in a good condition may be set on a initial setting screen by the user. The figure shows an example in which the threshold value is set as 500 kbps while the current communication speed is 400 kbps. Because the current communication speed is lower than the threshold value, it can be determined that the communication quality is bad. Communication quality may be subdivided by setting multi-level threshold values. Because such information is displayed, the user can know in detail and in advance whether a lot of time is needed for downloading due to its slow network communication speed, which makes the user feel less irritated or less inconvenient against a long time to complete downloading.

The condition of the network communication may be obtained by directly confirming whether to access the network upon playback of the optical disk 102 or by determining from the latest connection record in the circuit-condition history list described above.

When the circuit-condition history list is used, the system control unit 101 reads out the information stored in advance in the memory 120 as described above, so that the system control unit can quickly grasp without sequentially accessing the optical disk 102 whether the network circuit is available. In addition, the information displayed in the area 803 for displaying the status of the network circuit does not always need to be displayed in the alarm screen shown in FIG. 8; the circuit state may be indicated by a display tube, an LED or the like that is not shown in the figure but provided for the playback device 100; there may be provided with a function by which the circuit state is displayed on an initial setting screen in the playback device 100 or on another screen appearing by a special key. Provided with a user interface that simply and quickly displays such information, the user can grasp at a glance whether the network connection can be performed. Because such information is displayed, the user can use it to determine whether network cable breaking exists, and to immediately know the speed of the network circuit.

Furthermore, as another auxiliary relevant information, such information as whether the amount of downloading memory is larger than a specific size may be displayed in an area 804 for displaying download environment. From such information, the user can estimate and know whether the playback device 100 has enough recording area to contain the information when it is downloaded through the network. In addition, the specific size may be set by the user in the initial setting screen or the like, or may be set as a possible maximum size to be downloaded when the optical disk 102 is inserted. From the information, the user can know in advance and in detail about a recording amount necessary for downloading or a recordable area in the playback device 100; therefore, a malfunction that all of the recording area is consumed during download to abort the downloading can be prevented from occurring.

FIG. 9 shows the operation flow of Embodiment 1. A typical operation of the playback device 100 shown in FIG. 1 will be explained in detail, using FIG. 9 (referring to FIG. 1 to FIG. 8, when necessary). When an optical disk 102 is inserted in the playback drive unit 103, the system control unit 101 reads out file system information stored in the file management information area 211 in the optical disk 102. From the file system information, a logical directory structure shown in the FIG. 3 can be developed; then, the playback-control-information file 221, the program management file 222, and all program files 241 that are recorded in the optical disk 102 are read into the memory 120 according to instructions from the system control unit 101 (S101).

Then, the network-circuit-information acquiring unit 125 in the system control unit 101 checks whether a network destination is ready, by using the ping command that is a basic command to check whether IP packets can reach to a destination in a TCP/IP network (S102). Because it is possible to measure an arrival time from the destination by the ping command, the circuit speed of the network can be calculated. Although an example in which the ping command is used is described in the present embodiment, a similar command may be used to check its network connection.

The information obtained above is outputted from the network-circuit-information acquiring unit 125 as a connection condition signal, and stored in the memory 120 or the HDD 122 (the information is referred to as "a network circuit information analysis result") as the circuit-condition history list shown in FIG. 7. Since the circuit-condition history list is contained in the memory 120, whether or not the network circuit is available is immediately known by accessing the list, even if the optical disk 102 is not inserted. Obtaining the network circuit information (the network availability and the circuit speed calculation) is not limited to a time when the disk is inserted or before its title is played back; the information may be obtained when turning on the power for the playback device 100 before playing back the title, or obtained by measuring at fixed intervals (poling). The device may be configured so that the user can change on the initial setting screen or the like, the methods and frequencies of obtaining the network circuit information. By configuring in such a way, the system control unit 101 does not perform unnecessarily a lot of communication controls, so that the load of the entire system can be curbed.

Then, when a program title number to be played back is inputted from the operation unit 130, the system control unit 101 reads its program title information (504, 505, and 506) corresponding to the program title number from the playback-control-information file 221 developed in the memory 120. And then, the system control unit 101 determines from the "type_of_title 504" whether the type of the program title is "a normal title" or "a program title". If its type is a "program title", the program management file 222 specifies a program to be executed on the basis of the information in the "ref_to_program_id 506". When the program is specified, the information in the "program_name 602" can specify its program file 241 to be executed.

The network-connection-necessity determining unit 124 in the system control unit 101 reads out each "type_of_application 604", which shows its network connection necessity, for all applications that compose the program file 241, and outputs it as a detection signal, which is stored into the memory 120 or the HDD 122 with an "application_ID 605" that is an ID number specifying its application (S103) (the stored information is referred to as "network-connection-requirement indication information"; the "type_of_application 604" and the "application_ID 605" may be included in the detection signal).

The present embodiment exemplifies that the information (the "type_of_application 604") stored in the program management file 222 is used to determine whether the program file 241 needs "network connection"; however, the actual program file 241 itself may be analyzed to directly obtain information whether it needs network connection.

Next, the effective memory volume determining unit 126 in the system control unit 101 obtains size information of contents to be downloaded for each application described above (S104). Explanations will be made under an assumption that the size information about the contents to be downloaded is stored in the execution program file 241. The effective memory volume determining unit 126 appropriately obtains a free-space amount of the HDD 122—that is a storage for downloading and provided in the playback device 100, outputs its free-space amount information as a volume detection signal, which is recorded into the memory 120 or the HDD 122 with the size information of the contents to be downloaded (the information is referred to as "size information of the download contents").

Then, the system control unit 101 determines, according to the "network circuit information analysis result" (that is, the connection condition signal), the "network-connection-requirement indication information" (that is, the detection signal), and the "size information of the download contents" (that is, the volume detection signal) obtained in the steps S102, S103, and S104, whether to display the alarm screen shown in FIG. 7 and outputs its determination result as a determination signal (S105). More specifically, on the basis of the "network-connection-requirement indication information" (detection signal), it is checked whether the inserted optical disk 102 includes contents requiring the network connection. When it is confirmed that the optical disk 102 does not need the network connection, there is no need to display the alarm screen shown in FIG. 7, which makes a transition to a normal playback step (S108). Furthermore, even when the "network-connection-requirement indication information" (detection signal) indicates that the inserted optical disk 102 requires the network connection, but if the "network circuit information analysis result" (connection condition signal) guarantees enough circuit speed for downloading and if the "size information of the download contents" (volume detection signal) indicates that there is enough free space in the HDD for downloading, there is no need to display the alarm screen shown in FIG. 7, which makes a transition to a normal playback step (S108).

On the other hand, when the "network-connection-requirement indication information" (detection signal) indicates that the network connection is necessary, and if the "network circuit information analysis result" (connection condition signal) indicates that the downloading itself cannot be performed or there is not enough circuit speed for downloading, the alarm screen shown in FIG. 7 is displayed (S106). Furthermore, when the "network-connection-requirement indication information" (detection signal) indicates that the network connection is necessary, and if the "size information of the download contents" (volume detection signal) indicates that there is not enough free space in the HDD, the alarm screen shown in FIG. 7 is displayed (S106).

Displaying the alarm screen can let the user renew his awareness that the network is not ready. The playback device 100 may also be configured to display the reasons (slow network circuit speed, shortage of memory for downloading or the like) that the network is not ready.

Even when it is determined that the playback device 100 is not physically connected to the network circuit—such as disconnection of the circuit and unplugging of its connecting plug, they are displayed as reasons why the network is not ready. When no connection setting is performed for the playback device 100, such setting situation is displayed.

There may be a high probability to display the alarm screen shown in FIG. 8 every time when the optical disk 102 is played back. To cope with such cases, the initial setting screen and the like may be set so that the alarm screen itself is prevented from being displayed. Even in such cases, the alarm screen may be displayed only at the first normal access after the network-circuit-information acquiring unit 125 has become able to normally access the network.

By selecting and pushing down a 'continue current playback mode' button 801 or a 'change to non-network ready mode' button 802 on the alarm screen, it is determined whether to change to the non-network playback mode (S107).

When the 'continue current playback mode' button 801 is pushed through the operation unit 130, operations are changed into a playback step in the normal playback mode (S108). Then, the system control unit 101 executes the program files 241 that is developed in the memory 120 for playing back. If there exist stream information files 231 linked from the program files 241, the stream information files 231 that have been coded/compressed are decoded to be video/audio-outputted to the display 115.

When the 'change to non-network-ready mode' button 802 is pushed through the operation unit 130, a network readiness flag contained in the system register set 123 is changed to OFF (network is not ready) (S109). After that, playback operations similar to those described above are performed in the non-network-ready mode (S110).

As described above, by changing the network readiness flag in the system parameters to OFF (the network is not ready) for playing back, the optical disk 102 can be played back while a playback path independent of network connection is selected.

Although Embodiment 1 exemplifies that the alarm screen is displayed before a program title is played back, the screen may be displayed when inserting the optical disk 102 or just before executing an application that requires network connection. Whether or not the alarm screen is displayed may be determined only by the evaluation of the "network circuit information analysis result" (connection condition signal) (S102) shown in FIG. 9, without the evaluation of the "network-connection-requirement indication information" (detection signal) (S103) and the "size information of the download contents" (volume detection signal) (S104) shown in FIG. 9; whether or not to display the alarm screen may be determined according to a combination of some of those signals. In addition, by setting on the initial setting screen the options to be selected in S107, the options may be automatically selected without displaying the alarm screen shown FIG. 8.

If configuring the device according to Embodiment 1, whether the optical disk needs network connection is checked before the program title is played back, so that its check results can be automatically displayed on the display. Therefore, the user can quickly see at a glance whether an optical disk needs network connection, or in advance whether the environment is not in a network-ready state. Furthermore, when the playback mode of the playback device 100 is changed to the non-network-ready mode on the alarm screen, the device has an effect that the user can continue to watch the program title at ease without interruption of playback of the title due to such a reason that downloading cannot be performed during playback of the optical disk.

That is, before playing back the optical recording medium that needs network connection, the playback device determines whether the network circuit can be used; and when it cannot be used, the device shows the fact on the alarm display or the like so that the user can easily confirm them. The user can see at a glance and in advance whether its contents need network connection and the reasons why the network is not ready. Thus, it is possible to reduce possibility of operations that are fundamentally unnecessary for users.

Furthermore, because the device is configured so that the device can recognize in advance the amount of free space in a storage provided in the device to record downloaded contents and the amount of information to be downloaded, the device can prevent a malfunction, such as a download halt due to shortage of the amount of free space in the storage, from occurring.

When the network circuit is not ready for the playback device but playback is preformed with respect to an optical disk including programs requiring network connection, the device can automatically change its mode to the one independent of the network. The device can play back the optical disk according to a playback path that does not connect to the network; therefore, the device does not unnecessarily access network resources every time when the optical disk is played back.

Information that correlates the network readiness flags to the optical disks having been played back may be stored in the playback device 100 (for example, the HDD 122). Thereby, when the optical disk that has been once played back is played back again, the mode can be determined by referring to what mode it was played back in.

Furthermore, the playback device 100 may be configured in such a way that after playing back the contents the device restores the network readiness flag, which has been modified in S109, from OFF to ON.

What is claimed is:

1. A playback device for playing back an optical recording medium in which a stream and a program connecting to a data-supplying source corresponding to the stream through a network are recorded, and two playback paths are provided: a first path corresponding to a network corresponding mode in which the data of the stream is played back referring to the data supplied from the data-supplying source, and a second path corresponding to a network non-corresponding mode in which the data of the stream is played back without referring to the data supplied from the data-supplying source, the playback device comprising:
   a network-circuit-information acquiring unit that reads out, before playing back data of the stream recorded on the optical recording medium, information on the program corresponding to the stream and then outputs on the basis of the read-out information a connection condition signal concerning connection condition through the network between the playback device and the data-supplying source corresponding to the stream;
   a system control unit that outputs a determination signal representing whether or not to connect to the data-supplying source through the network on the basis of the connection condition signal; and
   a data playback unit that plays back the data of the stream using the first playback path of the network corresponding mode when the determination signal indicates that the data-supplying source is connected through the network, and using the second playback path of the network non-corresponding mode when the signal indicates that the data-supplying source is not connected through the network.

2. The playback device according to claim 1, wherein the network-circuit-information acquiring unit acquires the connection condition signal concerning connection condition between the device and the data-supplying source corresponding to the stream when the device is powered on.

3. The playback device according to claim 1, wherein the network-circuit-information acquiring unit acquires the connection condition signal concerning connection condition between the device and the data-supplying source corresponding to the stream when the optical recording medium is inserted into the device.

4. The playback device according to claim 1, wherein the network-circuit-information acquiring unit acquires the connection condition signal concerning connection condition between the device and the data-supplying source corresponding to the stream at predetermined intervals.

5. The playback device according to claim 1,
   wherein
   a plurality of the streams and a program connecting to each data-supplying source corresponding to each of the plurality of the streams through the network are recorded in the optical recording medium, the network-circuit-information acquiring unit outputs, for each of the plurality of the streams, the connection condition signal concerning connection condition between the playback device and the data-supplying source corresponding to the stream, and the system control unit output the determination signal representing whether or not to connect to the data-supplying source through the network on the basis of the connection condition signal corresponding to the stream selected for playback from the plurality of the streams.

6. The playback device according to claim 1, further comprising an effective memory volume determining unit that outputs a volume detection signal representing the volume of data supplied from the data-supplying source, wherein the system control unit outputs the determination signal indicating whether or not to connect to the data-supplying source through the network on the basis of the connection condition signal outputted from the network-circuit-information acquiring unit and the volume detection signal outputted form the effective memory volume determining unit.

7. The playback device according to claim 6, further comprising a local storage, wherein the effective memory volume determining unit compares data volume supplied from the data-supplying source with usable capacity of the local storage to output information on the basis of the comparison result.

8. The playback device according to claim 1, wherein the connection condition signal outputted from the network-circuit-information acquiring unit is a signal concerning at least one of the playback device's connection setting condition with the network, a physical connection condition between the playback device and the network, and a communication speed, the playback device and the network.

9. The playback device according to claim 1, wherein the determination signal outputted from the system control unit is displayed on a display connected to the playback device.

10. A playback method for playing back an optical recording medium in which a stream and a program connecting to a data-supplying source corresponding to the stream through a network are recorded, and two playback paths are provided: a first path corresponding to a network corresponding mode in which the data of the stream is played back referring to the data supplied from the data-supplying source, and a second path corresponding to a network non-corresponding mode in which the data of the stream is played back without referring to the data supplied from the data-supplying source, the playback method comprising:

a network-circuit-information acquiring step in which, before playing back data of the stream recorded on the optical recording medium, information on the program corresponding to the stream is read out and then a connection condition signal concerning connection condition through the network to the data-supplying source corresponding to the stream is outputted on the basis of the read out information;

a system control step in which a determination signal representing whether or not to connect to the data-supplying source through the network is outputted on the basis of the connection condition signal; and a data playback step in which the data of the stream is played back using the first playback path of the network corresponding mode when the determination signal indicates that the data-supplying source is connected through the network, and using the second playback path of the network non-corresponding mode when the determination signal indicates that the data-supplying source is not connected through the network.

11. The playback method according to claim 10, wherein in the network-circuit-information acquiring step, the connection condition signal concerning connection condition to the data-supplying source corresponding to the stream is acquired when the device is powered on.

12. The playback method according to claim 10, wherein in the network-circuit-information acquiring step, the connection condition signal concerning connection condition to the data-supplying source corresponding to the stream is acquired when the optical recording medium is inserted into the device.

13. The playback method according to claim 10, wherein in the network-circuit-information acquiring step, the connection condition signal concerning connection condition to the data-supplying source corresponding to the stream is acquired at predetermined intervals.

14. The playback method according to claim 10, wherein
a plurality of the streams and a program connecting to each data-supplying source corresponding to each of the plurality of the streams through the network are recorded in the optical recording stream, in the network-circuit-information acquiring step, for each of the plurality of the streams, the connection condition signal concerning connection condition to the data-supplying source corresponding to the stream is outputted, and in the system control step, the determination signal representing whether or not to connect to the data-supplying source through the network is outputted on the basis of the connection condition signal corresponding to the stream selected for playback from the plurality of the streams.

15. The playback method according to claim 10, further comprising an effective memory volume determining step of outputting a volume detection signal representing data amount supplied from the data-supplying source, wherein in the system control step, the determination signal indicating whether or not to connect to the data-supplying source through the network is outputted on the basis of the connection condition signal outputted in the network-circuit-information acquiring step and the volume detection signal outputted in the effective memory volume determining step.

16. The playback method according to claim 15, wherein the volume detection signal in the effective memory volume determining step is a signal based on data supplied from the data-supplying source.

17. The playback method according to claim 10, wherein the connection condition signal outputted in the network-circuit-information acquiring step is a signal concerning at least one of the playback device's connection setting condition with respect to the network, a physical connection condition to the network, and a speed of communication to the network.

18. The playback method according to claim 10, further comprising a displaying step of displaying the determination signal outputted in the system control step.

19. A non-transitory computer readable medium having stored thereon a playback program for playing back an optical recording medium in which a stream and a program connecting to a data-supplying source corresponding to the stream through a network are recorded and two playback paths are provided: a first path corresponding to a network corresponding mode in which the data of the stream is played back referring to the data supplied from the data-supplying source, and a second path corresponding to a network non-corresponding mode in which the data of the stream is played back without referring to the data supplied from the data-supplying source, the playback program comprising:

a network-circuit-information acquiring step in which, before data of the stream recorded on the optical recording medium is played back, information on the program corresponding to the stream is read out and then a connection condition signal concerning connection condition through the network to the data-supplying source corresponding to the stream is outputted on the basis of the read out information;

a system control step in which a determination signal representing whether or not to connect to the data-supplying source through the network is outputted on the basis of the connection condition signal; and a data playback step in which the data of the stream is played back using the first playback path of the network corresponding mode when the determination signal indicates that the data-supplying source is connected through the network, and using the second playback path of the network non-corresponding mode when the determination signal indicates that the data-supplying source is not connected through the network.

* * * * *